US008832197B2

(12) United States Patent
Lang

(10) Patent No.: US 8,832,197 B2
(45) Date of Patent: Sep. 9, 2014

(54) COLLABORATION AND REAL-TIME DISCUSSION IN ELECTRONICALLY PUBLISHED MEDIA

(71) Applicant: Richard Lang, Sebastopol, CA (US)

(72) Inventor: Richard Lang, Sebastopol, CA (US)

(73) Assignee: Collaborize Inc., Santa Rosa, CA (US)

( * ) Notice: Subject to any disclaimer, the term of this patent is extended or adjusted under 35 U.S.C. 154(b) by 0 days.

(21) Appl. No.: 13/778,085

(22) Filed: Feb. 26, 2013

(65) Prior Publication Data

US 2013/0275515 A1 Oct. 17, 2013

Related U.S. Application Data

(63) Continuation of application No. 13/645,396, filed on Oct. 4, 2012, now Pat. No. 8,392,504.

(60) Provisional application No. 61/621,962, filed on Apr. 9, 2012, provisional application No. 61/653,376, filed on May 30, 2012.

(51) Int. Cl.
*G06F 15/16* (2006.01)
*H04L 29/06* (2006.01)
*G06Q 10/00* (2012.01)

(52) U.S. Cl.
CPC ................... *H04L 65/403* (2013.01); *G06Q 10/00* (2013.01)
USPC ........... 709/204; 709/201; 709/202; 709/205; 709/223; 709/224

(58) Field of Classification Search
CPC .............. H04L 65/403; H04L 12/1818; H04L 12/1813; H04L 67/22
USPC .................. 709/201, 202, 204, 205, 223, 224
See application file for complete search history.

(56) References Cited

U.S. PATENT DOCUMENTS

| 7,152,092 | B2 | 12/2006 | Beams |
| 7,156,665 | B1 | 1/2007 | O'Connor |
| 7,280,991 | B1 | 10/2007 | Beams |
| 7,428,518 | B1 | 9/2008 | Zorba |
| 8,028,020 | B2 | 9/2011 | Huck |
| 8,392,504 | B1 | 3/2013 | Lang |
| 2011/0055403 | A1* | 3/2011 | Balachandran et al. ...... 709/227 |
| 2011/0065082 | A1 | 3/2011 | Gal |
| 2011/0289142 | A1 | 11/2011 | Whalin |
| 2011/0289433 | A1* | 11/2011 | Whalin et al. ................ 715/753 |
| 2012/0060106 | A1 | 3/2012 | Moxley |

(Continued)

OTHER PUBLICATIONS

U.S. Appl. No. 13/645,396; Office Action mailed Dec. 6, 2012.

*Primary Examiner* — Liangche A Wang
(74) *Attorney, Agent, or Firm* — Lewis Roca Rothgerber LLP

(57) ABSTRACT

A mobile device application allows a user to participate in a collaborative discussion. The collaborative discussion may allow multiple users to collaborate in a formatted discussion on a variety of topics. The collaborative discussion may be associated with media content provided through a media reader application. A user may act as an administrator to create a collaborate discussion and configure parameters or the collaborative discussion via the user's mobile device. A user may access the media content through the media reader application and provide input to the collaborative discussion in real time. The media may include an electronic book, magazine, article or other media content. The input received from the user may include a comment, vote, brainstorm content, various collaborative engagement structures or other data. The collaborative discussion may be accessed through a mobile device application or a network browser.

17 Claims, 11 Drawing Sheets

(56) References Cited

U.S. PATENT DOCUMENTS

2012/0151320 A1* 6/2012 McClements, IV .......... 715/230
2012/0266258 A1* 10/2012 Tuchman et al. ................ 726/28
2012/0290950 A1* 11/2012 Rapaport et al. .............. 715/753

* cited by examiner

COLLABORATION AND REAL-TIME DISCUSSION IN ELECTRONICALLY PUBLISHED MEDIA

CROSS-REFERENCE TO RELATED APPLICATIONS

This application is a continuation of and claims the priority benefit of U.S. patent application Ser. No. 13/645,396, titled "Collaboration and Real-Time Discussion in Electronically Published Media," filed Oct. 4, 2012, which claims the priority benefit of U.S. Provisional Application Ser. No. 61/621,962, titled "Collaboration and Real-Time Discussion in Electronically Published Media," filed Apr. 9, 2012, and of U.S. Provisional Application Ser. No. 61/653,376, titled "Collaboration and Real-Time Discussion in Electronically Published Media," filed May 30, 2012, the disclosure of each of which is incorporated herein by reference.

BACKGROUND OF THE INVENTION

1. Field of the Invention

The present invention generally concerns electronically published media. More specifically, the present invention concerns collaboration and real-time time discussion in the context of electronically published media.

2. Description of the Related Art

Electronic books (e-books) and other electronically delivered forms of media are quickly replacing traditional 'print based' media such as magazines and newspapers. While the content previously offered in print based form is still available (e.g., books, news articles, and magazine stories), new possibilities for interacting with the electronic media and users of that media are being made available by virtue of the dynamic nature of the media and the networked communication capabilities that electronic media delivery tools such as smart phones, tablets and web-based Internet connectivity have to offer.

SUMMARY OF THE INVENTION

Figure 1A:
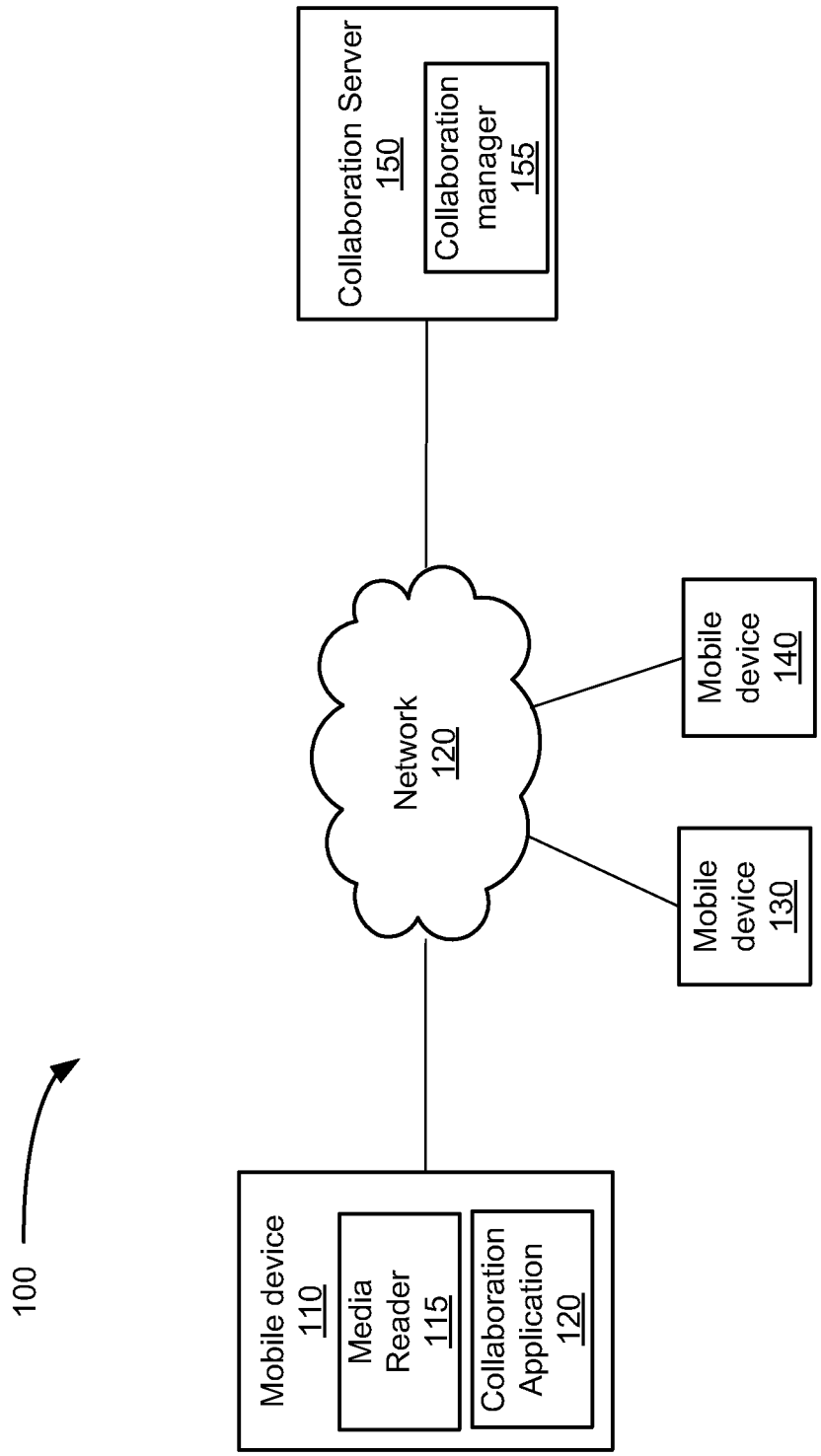
FIG. 1A illustrates a system for providing a collaboration system over a network.

Embodiments of the present invention take advantage of the near constant network connectivity experienced by mobile devices, smart phones, tablet and other computing devices. These devices may all be used to access electronically published content such as e-books, e-newspapers, e-magazines and other e-publications of various types. In addition to enjoying the ability to access dynamically updated content, these computing devices and environments, with their network connectivity, may also be used to engage in real-time collaborations or discussions concerning the electronically published content. These real-time discussions help create community, foster activity, and lead to creation of more user-tuned content selections.

Embodiments of the present invention allow users to access the same web-based collaboration/discussion topic that is dedicated to the particular topic. The content from the dedicated web page may be provided through a web browser application on a computer, mobile device or tablet device, as well as through a mobile device application The collaborative discussion data for each of topic may be accessed from a separate dedicated network address, such as a separate website. The media content is stored at a remote location in one or more servers (i.e., in the "cloud") and rendered locally at a mobile device for user participating in the discussion.

An embodiment may include a device for engaging in a collaborative engagement. The device may include a processor, a memory, a media reader application and a collaboration application. The media reader application may be stored in memory and executable by the processor to receive media content from a remote resource over a network and to provide the media content to a user. The media content may be associated with media stored at a remote server. The collaboration application may be stored in the memory and executed by the processor to access collaborative discussion data from a remote server for a collaborative discussion between the user and other users. The collaborative discussion data may be about one or more topics related to the media content. The collaborative discussion data for each of the one or more topics may be accessed from a separate dedicated network address.

DETAILED DESCRIPTION

A mobile device application allows a user to participate in a collaborative discussion. The collaborative discussion may allow multiple users to collaborate in a formatted discussion on a variety of topics. The collaborative discussion may be associated with media content provided through a media reader application. A user may act as an administrator to create a collaborate discussion and configure parameters or the collaborative discussion via the user's mobile device. A user may access the media content through the media reader application and provide input to the collaborative discussion in real time. The media may include an electronic book, magazine, article or other media content. The input received from the user may include a comment, vote, brainstorm content, or other data. The collaborative discussion may be accessed through a mobile device application or a network browser.

Users have access to a web-based collaboration/discussion topic through a network address associated with content, such as website, that is dedicated to the particular topic. The content from the dedicated web page may be accessed through a web browser application on a computer, mobile device or tablet device, as well as through a mobile device application such as a media reader application A collaborative application may provide the link to the network address for the collaborative discussion, such that the link may be embedded in a network content page provided by a second remote server, a media file such as an e-publication, another platform, or another application, including a remote application. The link may be provided by a mobile device, and the content associated with the link may be created by a template running at a specific browser-accessed website.

The media content from the dedicated web site may be stored at a remote location in one or more servers (i.e., in the "cloud"). When a user requests to view discussion content, content is rendered locally at the user's mobile device or computer via a network browser (web browser), or other rendering mechanism, such as a native application and/or mobile application, for user participating in the discussion.

FIG. 1A illustrates a system for providing a collaboration system over a network. Collaboration system 100 of FIG. 1 includes mobile device 110, 130 and 140, network 120, and collaboration server 150. Mobile device 110 may communicate with network 120 and be implemented as a smart phone, tablet computer, laptop computer, notebook computer, or other mobile device. Mobile device 100 may include media reader application 115 and collaborative application 120. Each of applications 115 and 120 may be implemented as one or more applications or modules stored on mobile device 110, or as a single application or module.

Media reader application 115 may be stored in memory and executed by one or more processors of mobile device 110 to receive, manage and provide media to a user through mobile device 110. Though the media is stored remotely on one or more remote servers (not illustrated), data associated with the media may be provided to the media reader application to allow the reader application to render text, video, images, voting results and other data associated with the media. The media content handled by media reader application 115 may include an electronic book, magazine, newspaper, article, text, image, video, audio, graphics, or other media content. Examples of media reader applications may include the "iBooks" application by Apple Computer, Inc., "Kindle" by Amazon, Inc., and the "Nook" application by Barnes and Noble.

Collaboration application 120 may be stored in memory and executable by one or more processors to provide a user with access to a collaboration discussion. Collaboration application 120 may be embedded within media reader application 115 or executed as a separate application. A user may create a collaborative discussion as well as participate in a collaborative discussion. Participating in a discussion may include providing comments, media, or other data related to one or more topics about media content viewed through media reader 120. The comments and data (communications) may be provided to collaborative manager 155 stored at collaboration server 150 and then transmitted to other users participating in the collaborative discussion.

In some embodiments, a participant in a collaborative discussion may have a collaborative application in some form on their device (i.e., mobile device) but may not have a media reader on their device. In other embodiments, a first participant may have a first type of media reader and a second participant in the same discussion may have a second type of media reader.

One or more interfaces associated with the collaborative discussion may be provided by a network service via a website. The network service may provide a plurality of websites such that each website is dedicated to a particular topic in the collaborative discussion.

Mobile devices 130 and 140 may also communicate with network 120 and may include a media reader and collaborative application (not shown in FIG. 1). The users of mobile devices 130 and 140 may view media and participate in a collaborative discussion via one or more applications executing on mobile devices 130 and 140, respectively. The media readers on mobile devices 120, 130 and 140 may be the same media reader application or different applications. The users of mobile devices 110, 130 and 140 may participate in the same (or different) collaborative discussions through their respective mobile device applications. Mobile device 130 includes a network browser 135. The network browser accesses the collaborative discussion content for a topic as provided by the topic's dedicated website and associated URL.

Network 120 may communication with mobile devices 110, 130 and 140 and collaboration server 150. The network 120 may include one or more of a private network, a public network, a local area network (LAN), a wide area network (WAN), the Internet, an intranet, or a combination of these networks. The network 120 may also include one or more cellular networks, Wi-Fi networks, and other networks.

Collaboration server 150 may include collaboration manager application 155 and communicate with network 120. The collaboration application 155 may store data for a particular collaboration project and manage a collaboration discussion created by an administrator. For example, collaboration server 150 may store interface templates, discussion title, discussion topics, the title, network address location, and actual content of media related to a topic of the collaboration discussion, user account information, user profiles, users participating in a discussion, communications received from discussion users and provided to one or more users, user participation analytics or related usage data, administrator information for a discussion, and other data. The data may be stored locally at collaboration server 150 and remotely.

Collaboration server may provide a dedicated website for each collaborative discussion topic. The dedicated websites may be accessed by network browsers and locally installed collaboration or other applications. Links to the dedicated websites may be shared on and by other network services, such as web-based social networking services.

Figure 1B:
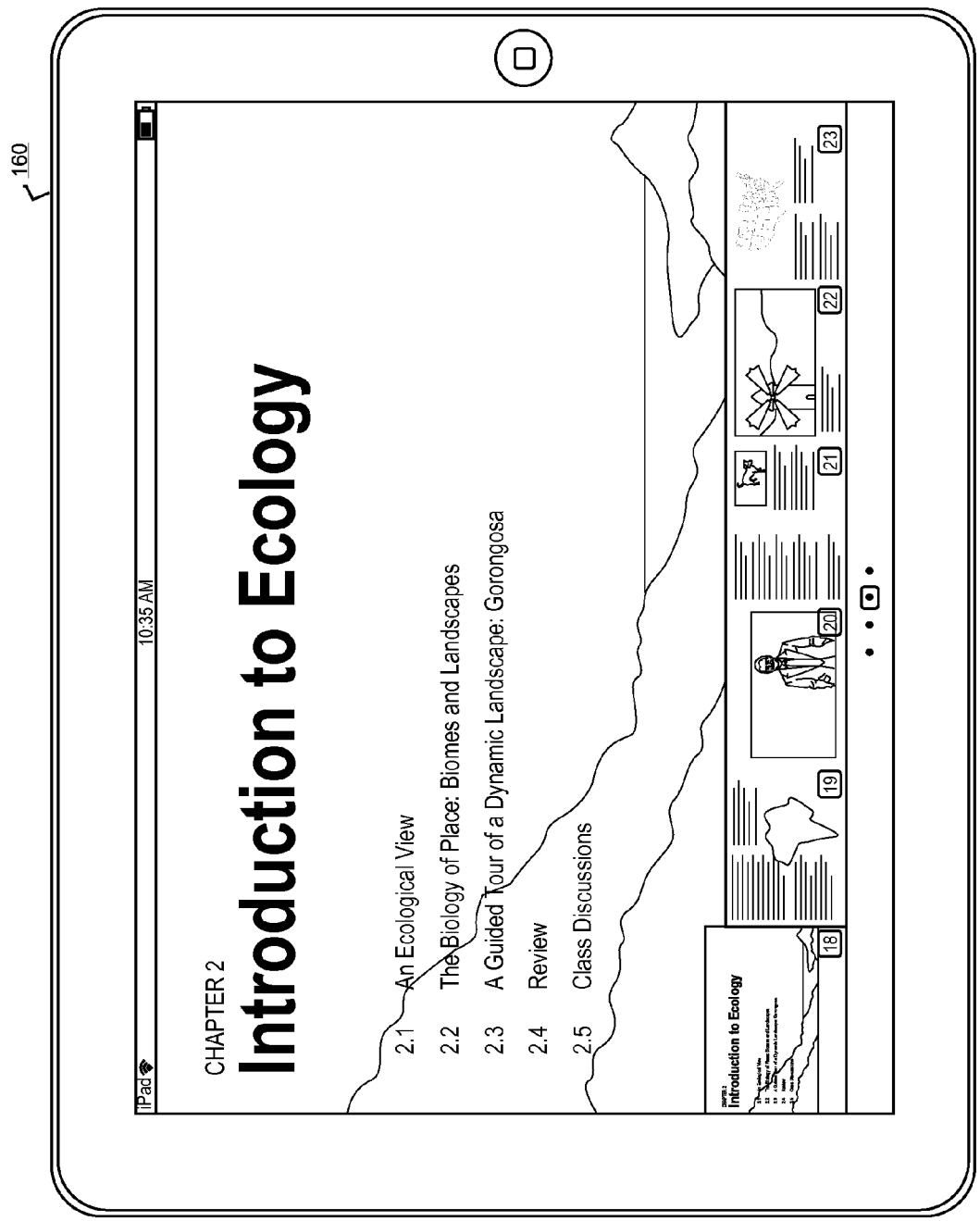
FIG. 1B illustrates an electronic book (e-book) interface.

FIG. 1B illustrates an electronic book (e-book) interface 160 as might be available from any number of publishers of electronic media. The e-book in this example is displayed on a tablet computing device. The e-book of FIG. 1B is for a particular chapter and lists various sections within that chapter. The e-book of FIG. 1B also displays individual page previews 170 as might be found within that chapter. While FIG. 1B is for an e-book, other forms of electronic media might be displayed, including magazines, electronic versions of private and public publications (for instances e-Annual Reports or eMarketing materials) and newspapers.

Content on the tablet computing device of FIG. 1B is typically received over a wireless communications channel such as a WiFi or cellular network signal. As a result of being constantly connected to a communications network, a user may receive new content as soon as that content becomes available. The media content may be "pushed" to the user's device or pulled by the user's device by a media reader application. In some instances, the application may pull the content from a host as the result of a scheduled request or a manual request for updated content should any be available.

In the course of reading a particular article, a user may become particularly engaged or involved in the article. The user may wish to engage in a collaborative discussion with other readers of the article. A collaborative discussion is distinct from a traditional discussion in that the various participants, in addition to discussing the selected material, are also able to engage in or take advantage of a structured and objective collaborative element such as a "yes or no" vote, the submission of a specific suggestion in response to a query, or the selection of one or more items from a list of choices, to name a few. These collaborative contributions bring "objective" elements to the otherwise subjective discussion (for instance, the number of "yes" or "no" votes can be counted, as opposed to a simple list of comments that require subjective analysis).

An advantage of using a mobile device with network connectivity such as a tablet computing device is that the user may engage in that discussion in real-time as they read the article or any portion thereof. For example, the interface provided by the collaborative application may provide a portion of the media content associated with the one or more topics, for example a portion of electronic article or book. By allowing for real-time discussion, the present invention takes advantage of an immediate mindset or a particular emotion or reaction that is invoked by the book, article, or story.

In some instances, the reaction could simply be discussion of the content with other likeminded individuals such as in a book club (an ad-hoc book club could literally form in the instant when one reader reaches out to other readers, using the collaborative engagement mechanism described herein). In other instances, the reaction might be a call to action such that the article causes the reader to engage in some proactive activity having been inspired by the article. In other instances, the user may simply be providing feedback, which may allow an author or host of the content to better tailor the content and make an update to the same, thereby resulting in dynamic and user-tailored content. In yet other instances, the reaction might be a concrete count of how many individuals share similar viewpoints or interpretations of the answer to a particular query.

Figure 2:
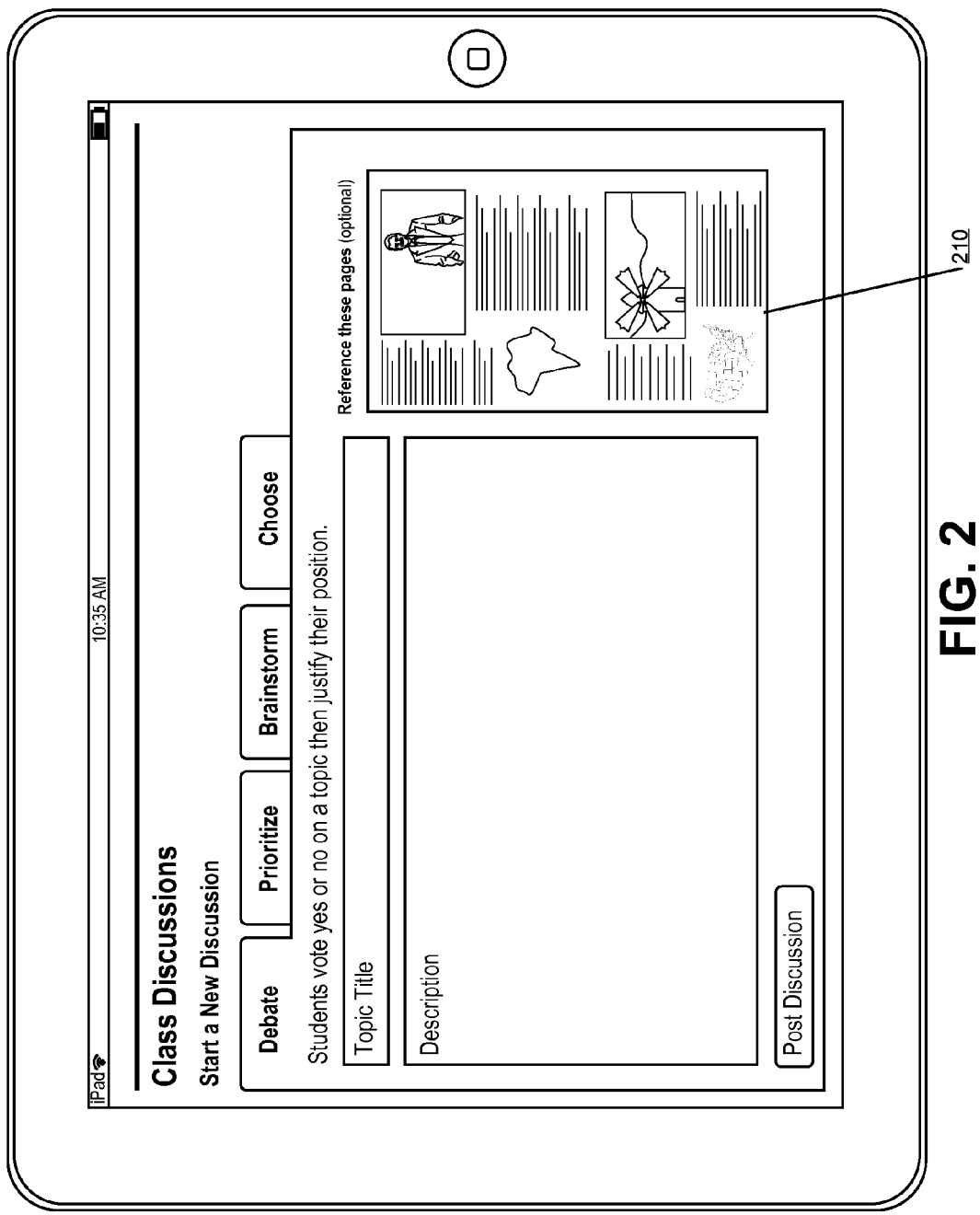
FIG. 2 illustrates a template for starting a discussion related to a particular piece of electronically published content.

This interaction might be achieved through an interface like the example shown in FIG. 2. FIG. 2 illustrates a template for starting a discussion related to a particular piece of electronically published content. The interface of FIG. 2 allows a user to begin a collaboration discussion in the form of a debate concerning the article, which is reflected as content 210 in the interface adjacent to the discussion portion of the interface. The user creates a topic based discussion type through a first interface (FIG. 1) provided by a collaboration application and may provide their thoughts and other communications in a discussion interface (FIG. 2). While FIG. 2 is shown in the context of a class discussion for a classroom textbook, the template may be modified for any number of users for use in any number of different contexts.

Upon completing their thoughts, the reader may then post those thoughts and/or other input for the collaborative discussion. Posting may include providing input through an interface provided by collaborative application 115, and transmitting the input by collaborative application 115 to collaboration manager 155 over network 120. The collaboration manager 155 may then provide the received input to one or more mobile devices associated with collaboration applications associated with the particular collaboration discussion.

Figure 3:
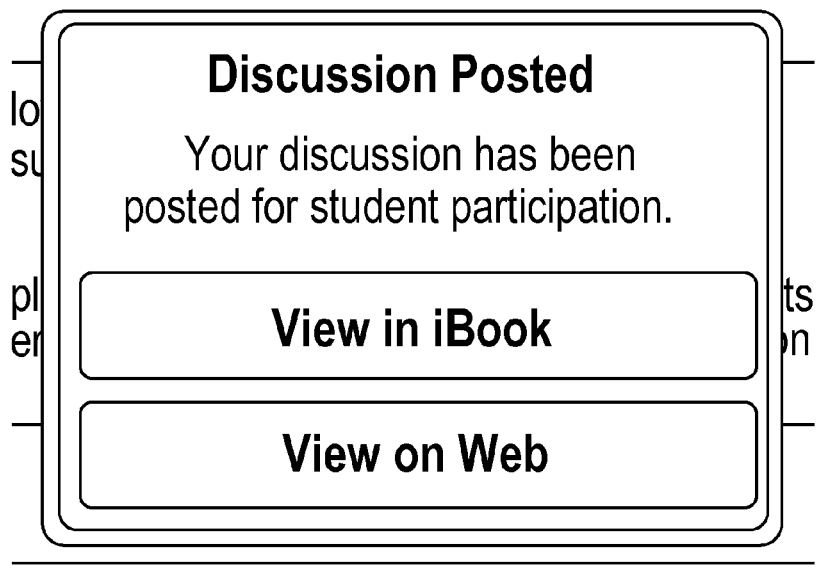
FIG. 3 illustrates an interface for posting discussions in different format.

Collaborative discussions may be posted in different formats as provided for by the interface shown in FIG. 3. By posting a discussion in an e-book format or some other mobile-device application based format, a user may engage in a discussion with other users utilizing a similar reader applications, which may be implemented on a similar or series of computing devices. In this regard, a particular reader application or functionality implemented in a third-party application may be available over a number of different computing devices and not native to a particular hardware device.

By posting in a format as shown in FIG. 3, a user may be able to engage in a discussion with users that do not have a media reader application or collaboration discussion application installed on a their mobile or computing device. These readers may access the same collaborative discussion content in a different format of the discussion, but still engage in the same discussion via a traditional web browser application, which may be accessed on any computing device including laptop and desktop computers, which may not be as mobile as a tablet device. Content pages or web pages may be provided to computing devices for rendering and interaction through the web browser by collaboration manager application 155 of server 150 in FIG. 1. In this way, a larger universe of readers may take part of the discussion (including those who do in fact participate via the native experience on an e-book or other e-publication reader application on a mobile device).

Figure 4:
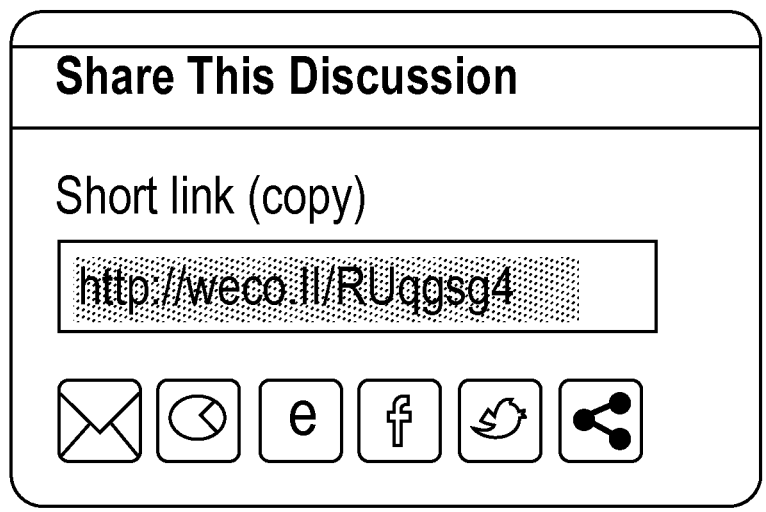
FIG. 4 illustrates an interface for sharing discussions over any number of communications mediums or social networks.

A further means of sharing the discussion may occur in the context of FIG. 4. FIG. 4 illustrates an interface for sharing discussions over any number of communications mediums or network based social network services. The interface is provided by a tool for sharing discussions over any number of communications mediums or social network services such as email, Google+, Facebook, and Twitter, and so forth. A collaboration application may include a built-in mechanism to generate a URL link to the web-based discussion, which may be shared using one of the aforementioned communications mediums or networks. In this way, users who might not already be a part of the discussion or reading the content can become engaged. This distribution, to potential readers or collaborators, of the URL link to the stand-alone web-based location of the selected collaborative discussion provides a way that any recipient of any collaborative discussion can forward access to said discussion to any other individual via social network services, email, Twitter-like broadcasting services, or any other distribution modality regardless of whether any particular recipient has access to a tablet or other mobile computing device.

For example, FIG. 1B is for a classroom textbook, which is likely only to be read by those taking the class. A discussion that comes from that classroom interaction, however, may affect people and groups outside of the class. A member of the discussion may elect to open the discussion up to the wider public and beyond those students in the class that are using the e-book reader and/or accessing the classroom material and discussion over the Internet. The member may do so by using a sharing tool like the one shown in FIG. 4. Use of the tool in FIG. 4 may be associated with certain restrictions such as read only, moderated comments, or the like, in light of the fact that the original discussion may be specifically focused on a classroom topic.

Figure 5:
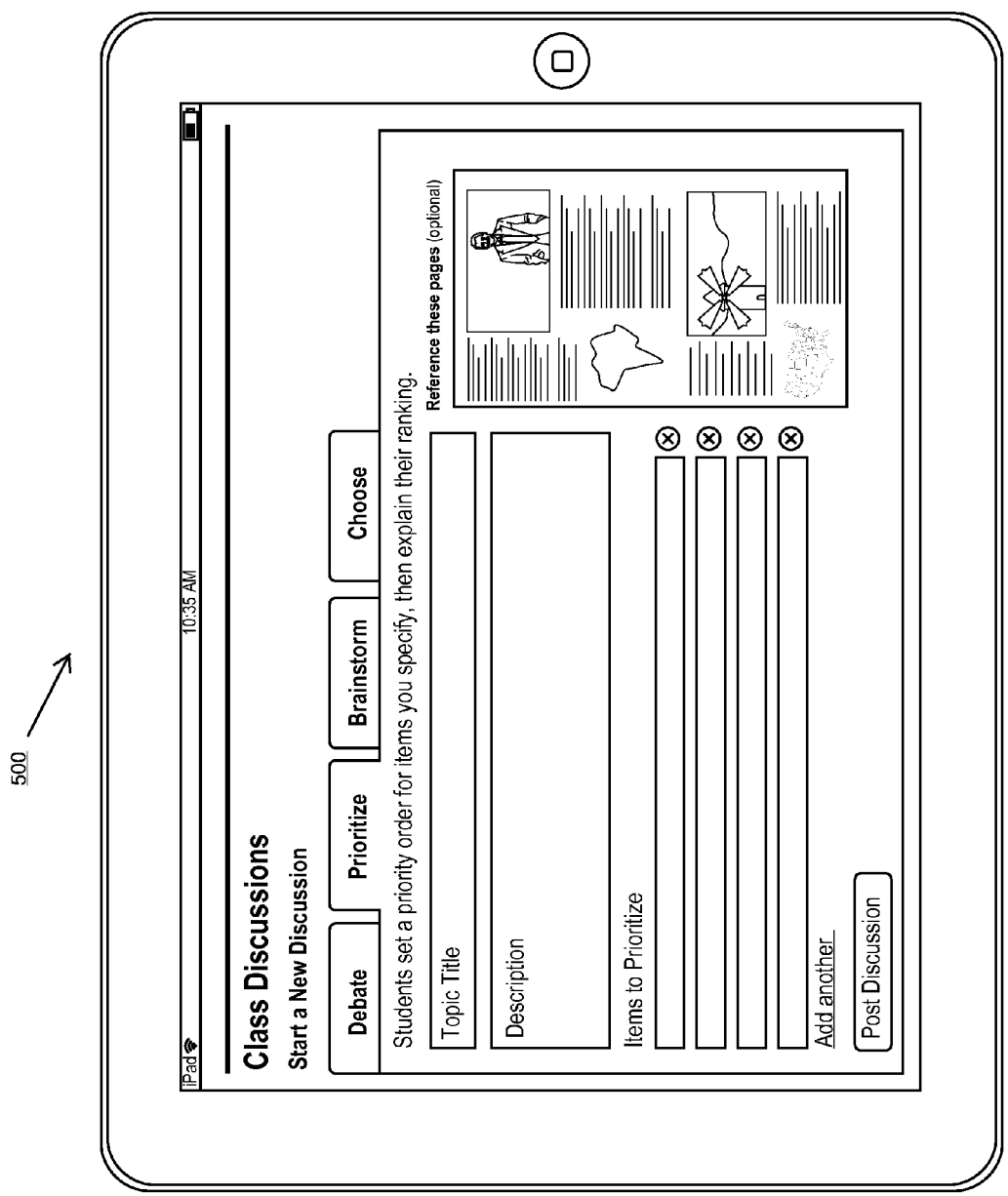
FIGS. 5-7 illustrate interfaces provided by a mobile device collaboration application for receiving input regarding a particular discussion.
Figure 6:
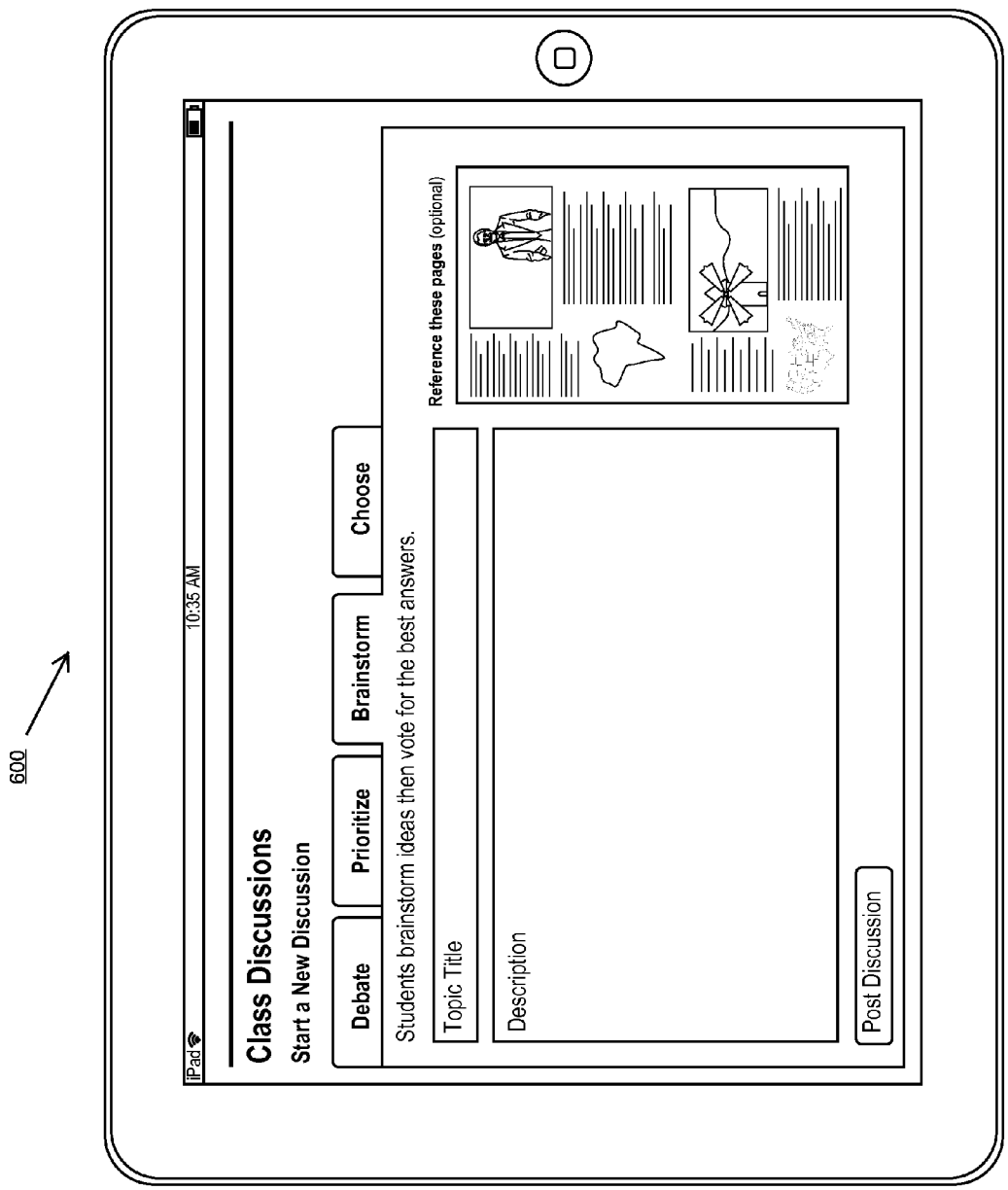
Figure 7:
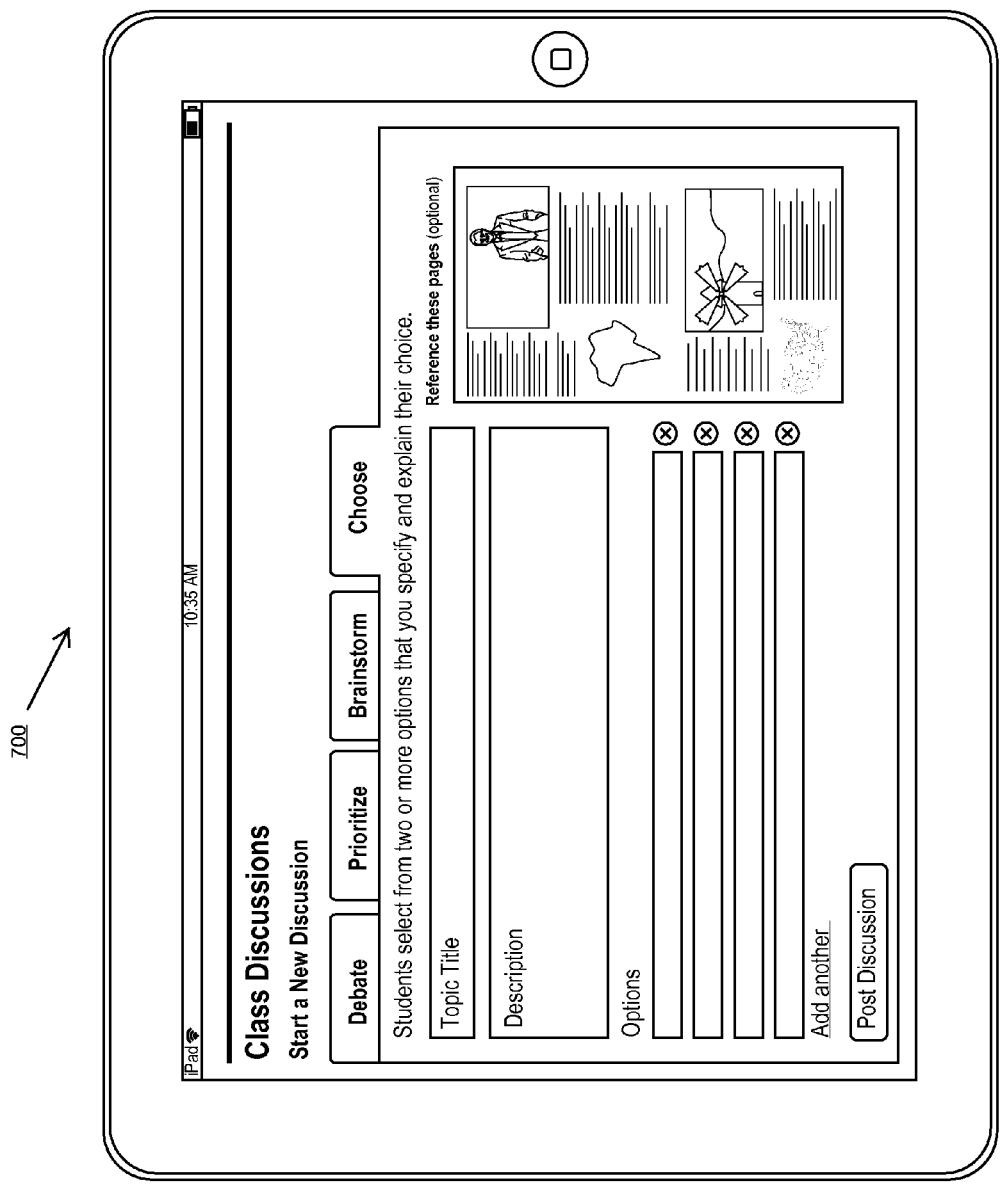

Additional sharing or collaboration features may be as part of a collaborative discussion provided over a network. For example, FIGS. 5-7 illustrate examples of interfaces provided by a mobile device collaboration application for receiving input regarding a particular discussion. FIG. 5 illustrates an interface 500 for prioritizing choices within a collaborative discussion. Interface 500 allows a user to provide a topic title, description, and items to prioritize. The interface of FIG. 5 also provides one or more media content pages to reference in association with the input provided.

FIG. 6 illustrates 600 an interface that allows for brainstorming on various aspects of a discussion. Interface 600 utilizing a structure method of collecting various inputted ideas by receiving a topic title and description. The interface of FIG. 6 provides one or more media content pages to allow a user to reference in association with the input provided. After the title and description are received, participants may vote and rank the various inputted ideas.

FIG. 7 illustrates an interface 700 which allows for a user to choose an option from a list and discuss why they made that choice. Interface 700 receives input of a topic title, description, and option selections from a user. The interface allows a user to reference a page of media content in association with the user's input.

Figure 8:
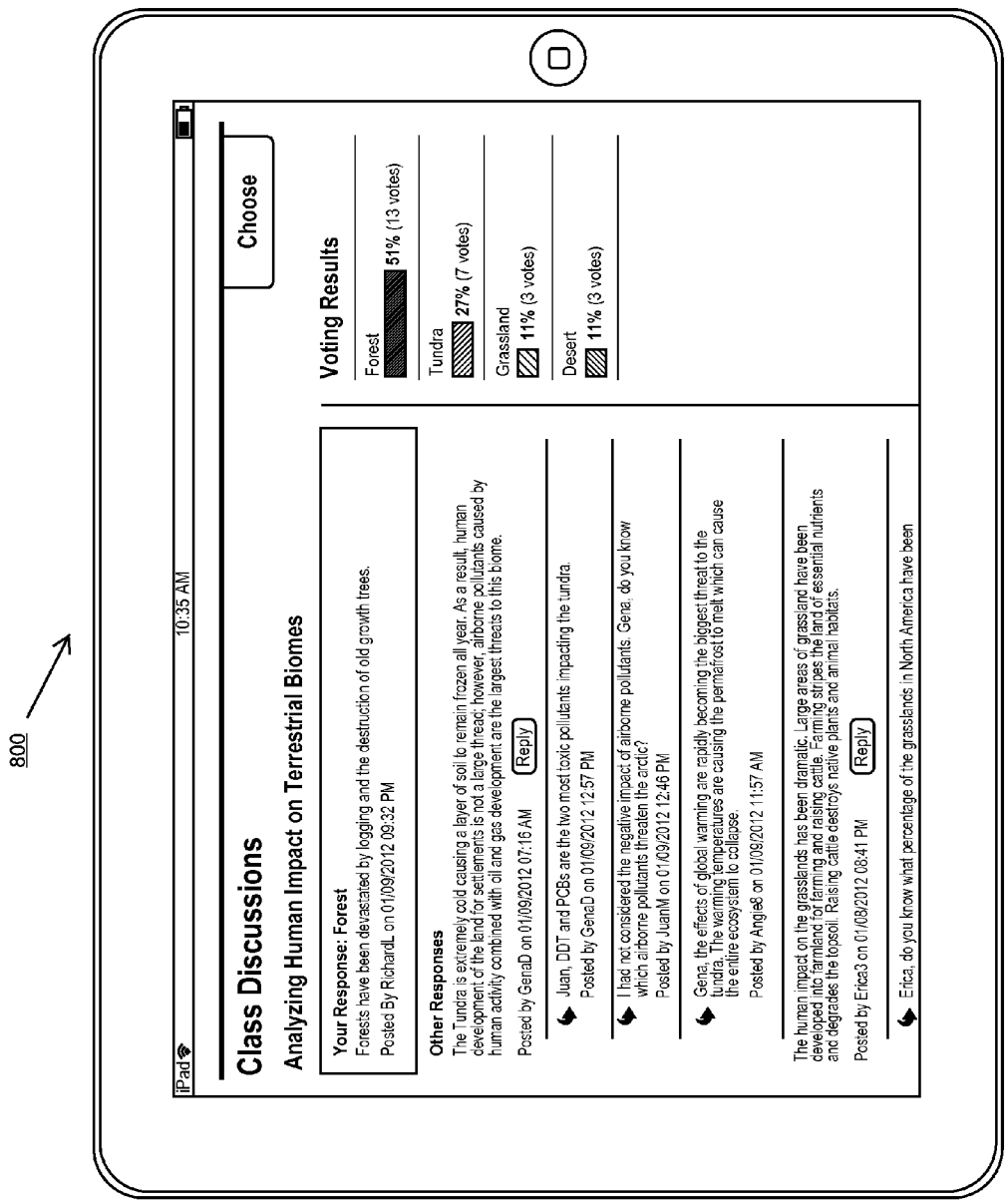
FIG. 8 illustrates an interface for collective collaborative effort of a discussion implemented in the context of the present invention.

FIG. 8 illustrates an interface 800 for providing collaborative discussion content. For example, the interface of FIG. 8 provides various aspects for debating, prioritizing, brainstorming, and choosing an action. Interface 800 provides information including a discussion title, the user's response to the discussion and responses provided by other users as part of the discussion. The discussion title is "Analyzing Human Impact on Terrestrial Biomes" and the user's response is "forest" followed by a description and the other responses include "tundra" and "grasslands." The interface 800 also provides voting results for different selections provided as part of the collaborative discussion. For example, "Forest" received 13 votes for 51%, "Tundra" received 7 votes for 27%, "Grassland" received 3 votes for 11%, and "Desert" received 3 votes for 11%.

Figure 9:
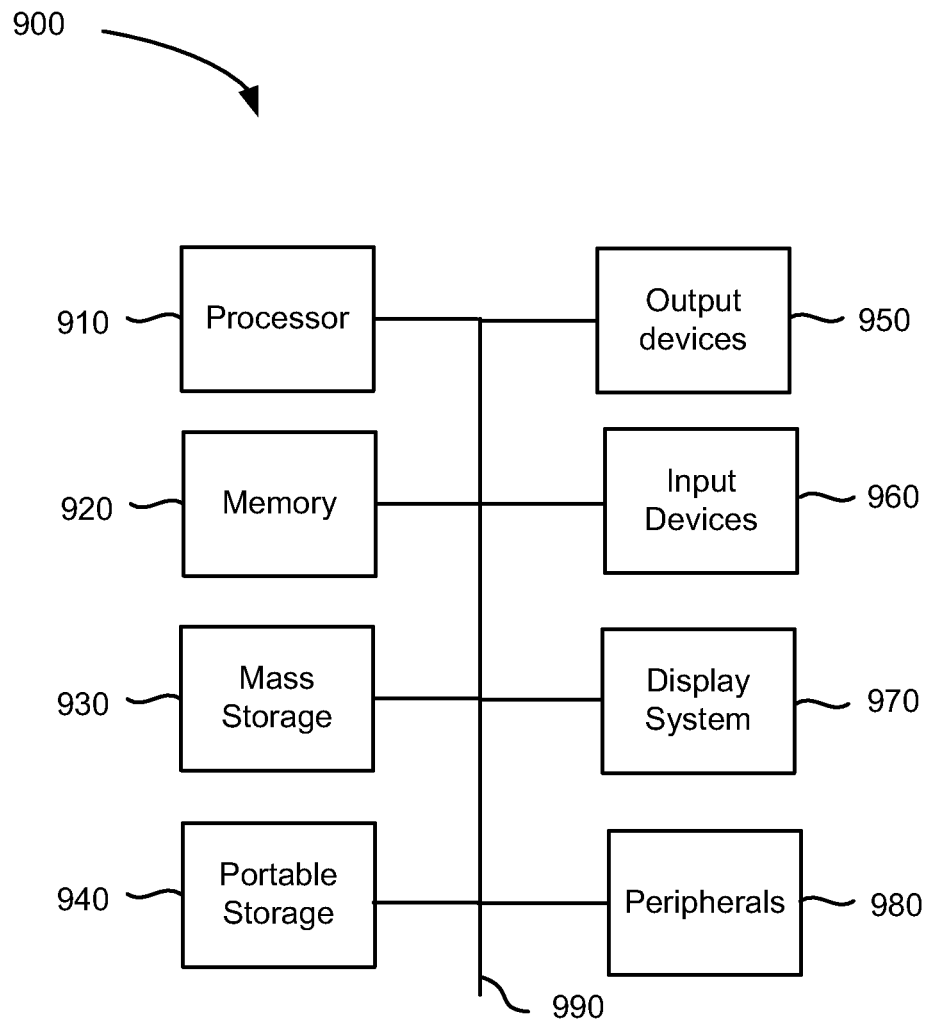
FIG. 9 illustrates an exemplary computing device.

FIG. 9 illustrates an exemplary computing system 900 that may be used to implement a computing device for use with the present technology. System 900 of FIG. 9 may be implemented in the contexts of the likes of server 150 FIG. 1. The computing system 900 of FIG. 9 includes one or more processors 910 and memory 920. Main memory 920 stores, in part, instructions and data for execution by processor 910. Main memory 920 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 990. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive or an optical disk drive, is a non-volatile storage device for storing data and instructions for use by processor unit 910. Mass storage device 930 can store the system software for implementing embodiments of the present invention for purposes of loading that software into main memory 920.

Portable storage device 940 operates in conjunction with a portable non-volatile storage medium, such as a floppy disk, compact disk or Digital video disc, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, voice recognition software (to permit direct, user verbal input) or a pointing device, such as a mouse, a trackball, stylus, or cursor direction keys. Additionally, the system 900 as shown in FIG. 9 includes output devices 950. Examples of suitable output devices include speakers, printers, network interfaces, and monitors.

Display system 970 may include a liquid crystal display (LCD) or other suitable display device. Display system 970 receives textual and graphical information, and processes the information for output to the display device.

Peripherals 980 may include any type of computer support device to add additional functionality to the computer system. For example, peripheral device(s) 980 may include a modem or a router.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 10:
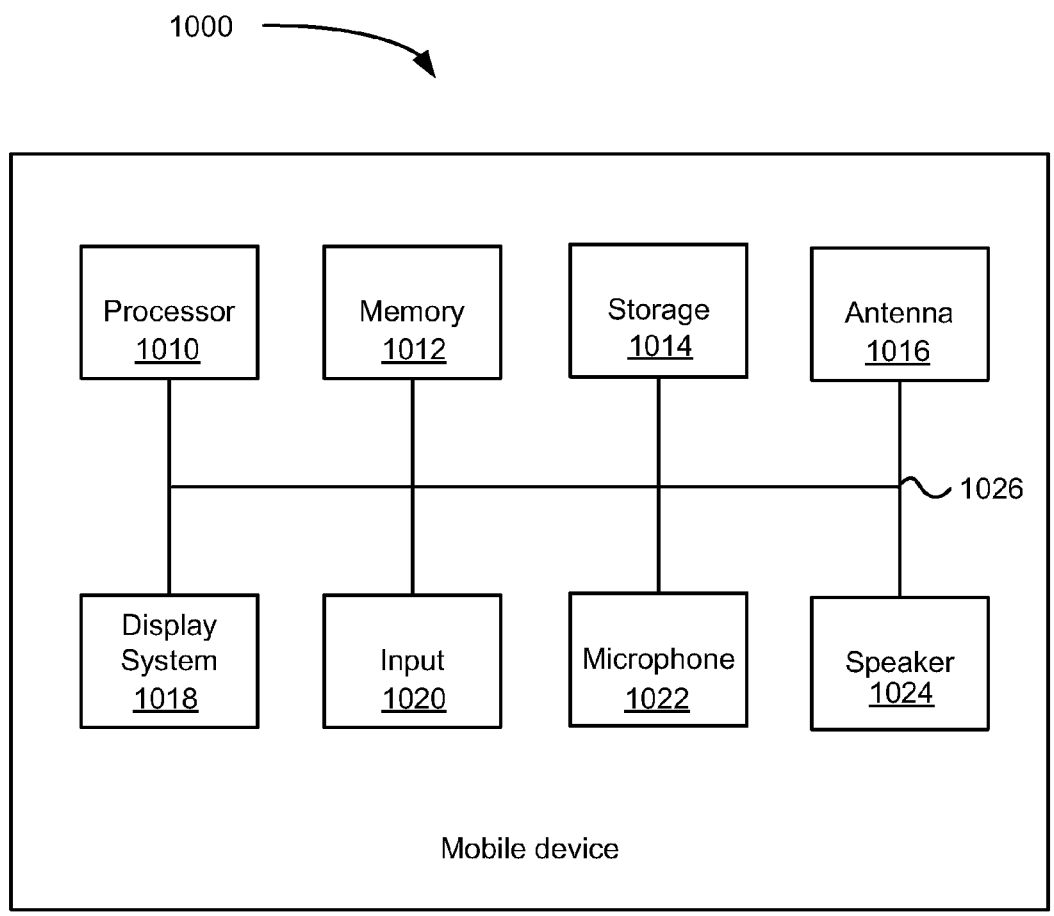
FIG. 10 illustrates an exemplary mobile device.

FIG. 10 illustrates an exemplary mobile device system 1000 that may be used to implement a mobile device for use with the present technology, such as for mobile devices 110, 130 and 140. The mobile device 1000 of FIG. 10 includes one or more processors 1010 and memory 1012. Memory 1012 stores, in part, programs, instructions and data for execution and processing by processor 1010. The system 1000 of FIG. 10 further includes storage 1014, one or more antennas 1016, a display system 1018, inputs 1020, one or more microphones 1022, and one or more speakers 1024.

The components shown in FIG. 10 are depicted as being connected via a single bus 1026. However, the components 1010-1024 may be connected through one or more data transport means. For example, processor unit 1010 and main memory 1012 may be connected via a local microprocessor bus, and storage 1014, display system 1018, input 1020, and microphone 1022 and speaker 1024 may be connected via one or more input/output (I/O) buses.

Memory 1012 may include local memory such as RAM and ROM, portable memory in the form of an insertable memory card or other attachment (e.g., via universal serial bus), a magnetic disk drive or an optical disk drive, a form of FLASH or PROM memory, or other electronic storage medium. Memory 1012 can store the system software for implementing embodiments of the present invention for purposes of loading that software into main memory 1010.

Antenna 1016 may include one or more antennas for communicating wirelessly with another device. Antenna 1016 may be used, for example, to communicate wirelessly via Wi-Fi, Bluetooth, with a cellular network, or with other wireless protocols and systems. The one or more antennas may be controlled by a processor 1010, which may include a controller, to transmit and receive wireless signals. For example, processor 1010 execute programs stored in memory 1012 to control antenna 1016 transmit a wireless signal to a cellular network and receive a wireless signal from a cellular network.

Display system 1018 may include a liquid crystal display (LCD), a touch screen display, or other suitable display device. Display system 1070 may be controlled to display textual and graphical information and output to text and graphics through a display device. When implemented with a touch screen display, the display system may receive input and transmit the input to processor 1010 and memory 1012.

Input devices 1020 provide a portion of a user interface. Input devices 1060 may include an alpha-numeric keypad, such as a keyboard, for inputting alpha-numeric and other information, buttons or switches, a trackball, stylus, or cursor direction keys.

Microphone 1022 may include one or more microphone devices which transmit captured acoustic signals to processor 1010 and memory 1012. The acoustic signals may be processed to transmit over a network via antenna 1016.

Speaker 1024 may provide an audio output for mobile device 1000. For example, a signal received at antenna 1016 may be processed by a program stored in memory 1012 and executed by processor 1010. The output of the executed program may be provided to speaker 1024 which provides audio. Additionally, processor 1010 may generate an audio signal, for example an audible alert, and output the audible alert through speaker 1024.

The mobile device system 1000 as shown in FIG. 10 may include devices and components in addition to those illustrated in FIG. 10. For example, mobile device system 1000 may include an additional network interface such as a universal serial bus (USB) port.

The components contained in the computer system 1000 of FIG. 10 are those typically found in mobile device systems that may be suitable for use with embodiments of the present invention and are intended to represent a broad category of such mobile device components that are well known in the art. Thus, the computer system 1000 of FIG. 10 can be a cellular phone, smart phone, hand held computing device, minicomputer, or any other computing device. The mobile device can also include different bus configurations, networked platforms, multi-processor platforms, etc. Various operating systems can be used including Unix, Linux, Windows, Macintosh OS, Google OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for creating a collaborative discussion on a user device, the method comprising executing instructions stored in memory, wherein the execution of the instructions by the processor:
   stores the media content in one or more servers;
   provides a collaborative discussion interface, wherein the collaborative discussion interface displays a plurality of structured discussions for starting and participating in a discussion;
   creates a collaborative discussion using a user-selected structured discussion of the plurality of structured discussions; and
   posts the created collaborative discussion over a network, such that the posted collaborative discussion is accessible by a plurality of users by way of respective other user devices, wherein the collaborative discussion includes the media content, which is updated dynamically, and wherein the collaborative discussion includes a platform on which the plurality of users are capable of engaging in real-time collaborations or discussions concerning the media content.

2. The method of claim 1 further comprising receiving user input via a user interface of the user device, wherein the received user input includes media content and associated discussion data; and wherein the created collaborative discussion is based on the received media content and associated discussion data.

3. The method of claim 2, wherein the received associated discussion data is prompted by the user-selected type of structured discussion of the plurality of types of structured discussions.

4. The method of claim 1, wherein the user-selected type of structured discussion includes a voting element.

5. The method of claim 4, wherein the posted collaborative discussion further includes a platform on which the plurality of users are capable of engaging in a real-time vote.

6. The method of claim 1, wherein the received media content includes electronically published content.

7. The method of claim 1, wherein the user device is a mobile device, and wherein the collaborative discussion is created at a collaboration application running on the mobile device.

8. The method of claim 7, wherein posting the created collaborative discussion includes transmitting the created collaborative discussion, over a network, to the plurality of users by way of respective other mobile devices, the created collaborative discussion accessible by a respective collaboration application running on each of the other mobile devices.

9. The method of claim 8, wherein each collaboration application includes a sharing tool, which, when selected by a user, allows the user to share the created collaborative discussion with one or more new users who did not previously have access to the created collaborative discussion.

10. The method of claim 9, wherein the sharing tool generates a URL link to a web-based location of the created collaboration discussion.

11. The method of claim 1, wherein the created collaborative discussion is posted to a webpage.

12. The method of claim 1, wherein the created collaborative discussion is posted in one or more different formats.

13. The method of claim 12, wherein the one or more different formats include a mobile application format.

14. The method of claim 12, wherein the one or more different formats include a web-based format.

15. The method of claim 12, wherein the one or more different formats include an electronic book format.

16. The method of claim 1, wherein the execution of instructions by the processor further receives discussion input from one or more other users of the plurality of users via one or more of the respective other user devices, the discussion input prompted by the created collaborative discussion.

17. The method of claim 16, wherein the execution of instructions by the processor further updates the created collaborative discussion in real time, based on the received discussion input.

* * * * *